Figure 1:
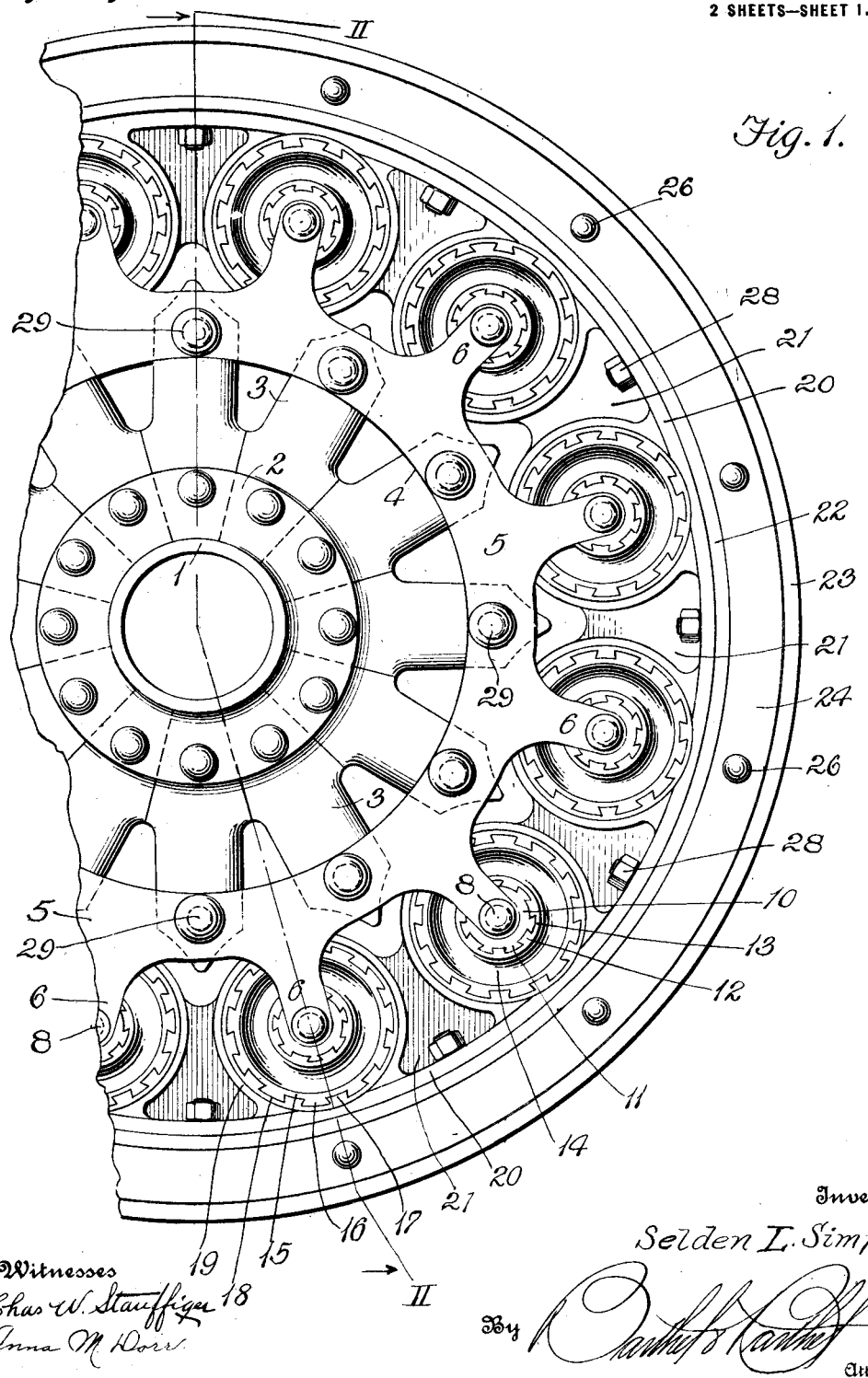

S. L. SIMPSON.
VEHICLE WHEEL.
APPLICATION FILED JAN. 23, 1914.

1,141,429.

Patented June 1, 1915.
2 SHEETS—SHEET 1.

Witnesses
Chas. W. Stauffiger
Anna M. Dorr

Inventor
Selden L. Simpson,
By
Attorneys

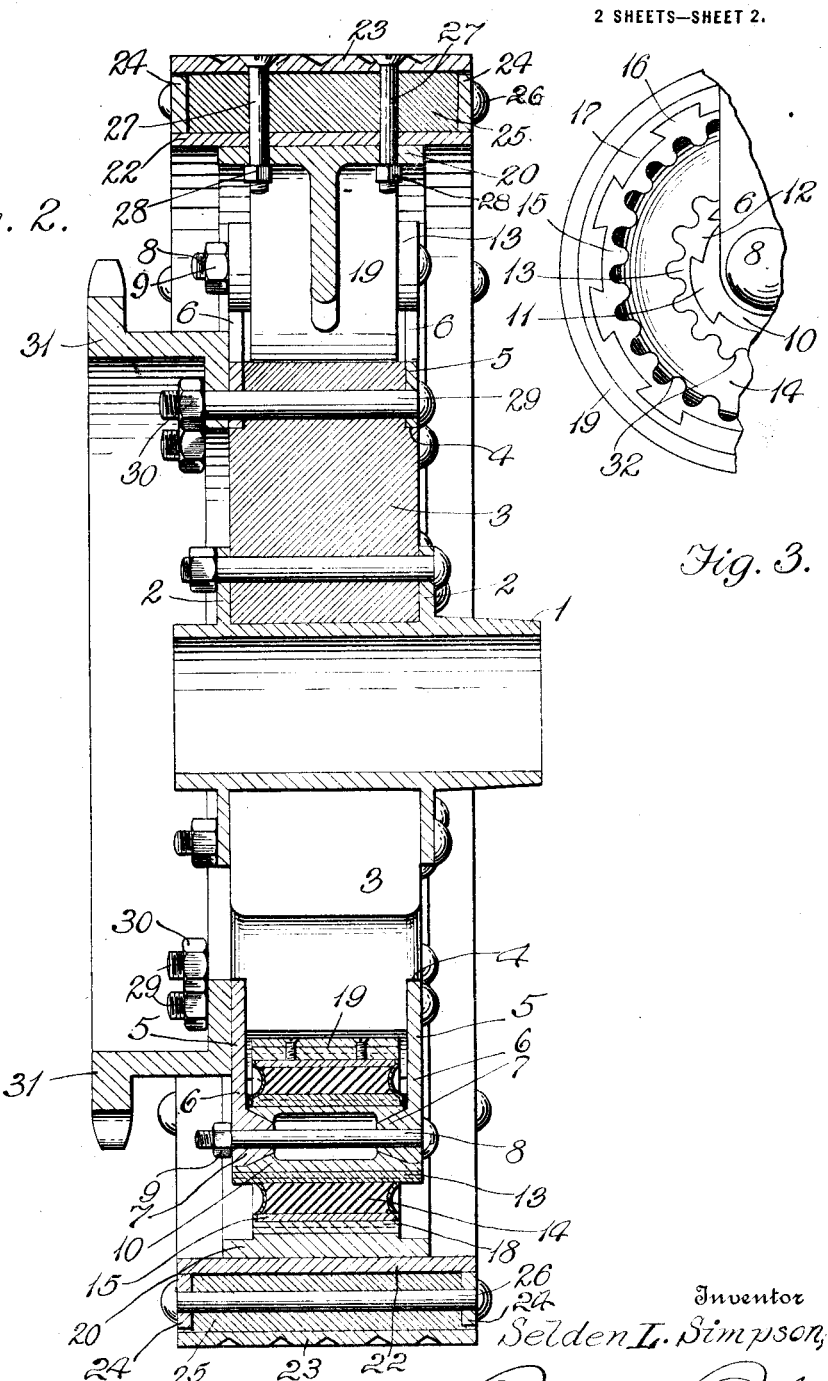

UNITED STATES PATENT OFFICE.

SELDEN L. SIMPSON, OF DETROIT, MICHIGAN, ASSIGNOR OF ONE-HALF TO WILLIAM E. CURRIE, OF DETROIT, MICHIGAN.

VEHICLE-WHEEL.

1,141,429.  Specification of Letters Patent.  Patented June 1, 1915.

Application filed January 23, 1914. Serial No. 813,827.

*To all whom it may concern:*

Be it known that I, SELDEN L. SIMPSON, a citizen of the United States of America, residing at Detroit, in the county of Wayne and State of Michigan, have invented certain new and useful Improvements in Vehicle-Wheels, of which the following is a specification, reference being had therein to the accompanying drawings.

This invention relates to vehicle wheels, and more particularly to that type wherein yieldable or resilient bodies are interposed between the felly and the rim of a wheel for cushioning and yieldably supporting the hub portion of the wheel, to insure easy riding of the vehicle upon irregular and rough roads or surfaces.

The primary object of my invention is to provide a vehicle wheel of the above type wherein hard and soft rubber or a similar material or composition is used for cushioning purposes, the rubber having such form as to provide a plurality of separate and circumferentially arranged cushioning elements or units between the felly and the rim of a wheel.

Another object of my invention is to provide a vehicle wheel that can be advantageously used in connection with automobiles and motor driven vehicles, the construction and arrangement of the yieldable or resilient elements being such as to increase the road worthiness of the automobile, without accident, as puncture, stone bruise and other well known tire trouble.

A further object of my invention is to provide a wheel of the above type that has radiating members or spokes with their ends yieldably supported concentric of independent yieldable bodies supported by the rim of the wheel, whereby all of the yieldable bodies are brought into action when the hub portion of the wheel assumes other than a position concentric to the rim of the wheel.

The above and other objects are attained by a novel construction, combination and arrangement of parts that will be hereinafter specifically described and then claimed.

Reference will now be had to the drawings, wherein—

Figure 1 is a side elevation of a portion of a wheel in accordance with this invention; Fig. 2 is a cross sectional view of the same, taken on the line II—II of Fig. 1, and Fig. 3 is a side elevation of a portion of one of the cushioning elements illustrating a modification of the invention.

In describing my invention by aid of the views above referred to, I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings, the reference numeral 1 denotes a hub provided with peripheral flanges 2 and secured between said flanges in the ordinary and well known manner are the inner ends of spokes 3. The spokes 3 have the outer ends thereof, at their sides, chamfered or cut away, as at 4 to provide seats for circular side plates 5, said plates being spaced apart by the outer ends of the spokes and constituting the felly of the wheel. The outer edges of the side plates 5 are scalloped or formed with radiating equally spaced and oppositely disposed arms 6, which have the inner sides thereof provided with tapering apertured bosses 7 connected by transverse bolts 8 that extend through said bosses and connect said arms. The bolts 8 are retained in position by nuts 9.

Arranged upon the bosses 7 between the arms 6 are tubes 10, said tubes having the ends thereof shaped to bear upon the bosses 7, as best shown at the lower part of Fig. 2. The tubes 10 have the peripheries thereof provided with longitudinally extending equally spaced dove-tail tongues 11 and interlocking with said tongues are similar tongues 12 of a hard rubber sleeve 13 fitted upon said tubes.

Surrounding the hard rubber sleeve 13 and formed integral therewith is a soft rubber body 14 having concave sides. Surrounding the soft rubber body 14 and formed integral therewith is a hard rubber sleeve 15, said sleeve having the periphery thereof provided with equally spaced dove-tail tongues 16 that interlock with similar tongues 17 forming part of a metallic band that surrounds the hard rubber sleeve 15. The band 18 is shrunk or otherwise mounted in a cylindrical housing 19 forming part of a rim 20, and the housings of said rim 110 are connected by webs 21 arranged intermediate the ends of each housing.

Arranged upon the rim 20 is a tire, comprising bands 22 and 23 spaced apart by circular plates 24 and a filler or spacer 25, which is preferably made of wood. The side plates 24 are connected by transverse rivets 26 or other fastening means that extend through the filler 25, and the tire is retained upon the rim 20 by bolts 27 and nuts 28 or other fastening means. The tire is of greater width than the rim 20 and the band 23 of said tire constitutes a tread, which is roughened or provided with an irregular surface for anti-skidding purposes.

The side plates 5 are connected to the spokes 3 by transverse bolts 29 and nuts 30, and the same fastening means is employed for retaining a sprocket wheel 31 in engagement with the inner side of the wheel.

In Fig. 3 of the drawings, there is illustrated a slight modification of my invention, wherein the soft rubber body 14 has the inner and outer sides thereof scalloped or corrugated, as at 32 to interlock with similar surfaces of the hard rubber sleeves 13 and 15. It is in this connection, that the hard rubber sleeves can be formed integral with the soft rubber bodies when manufactured and the sides of the soft rubber bodies can be reinforced with canvas, any material or by any process that will make the sides thereof indurate and not susceptible to deterioration by the forces of nature or foreign matter encountered during the use of the wheel.

I attach considerable importance to the fact that each set of arms of the side plates 5, which in reality are a continuation or prolongation of the spokes 3, are yieldably supported concentrically of independent bodies carried by the rim of the wheel, and that the arrangement of the bodies is such that they all coöperate in cushioning the hub portion of the wheel relatively to the rim. Irrespective of the direction of movement of the hub portion of the wheel, the movement is resisted by all of the yieldable bodies and by utilizing rubber as a cushioning element, the longevity of the wheel is considerably increased when compared with wheels having metallic resilient cushioning elements.

What I claim is:—

1. In a vehicle wheel, a felly, a rim, cylindrical housings carried by said rim in proximity to said felly, a tire carried by said rim, bands mounted in said housings, tubes concentrically of said housings for supporting said felly and yieldable fabricated bodies arranged between said bands and said tubes.

2. In a vehicle wheel, a felly, sets of radiating arms carried thereby, bolts connecting the arms of each set, a rim, cylindrical housings carried by said rim and extending between the arms of each set, bands mounted in said housings, hard rubber sleeves interlocked with said bands, tubes supported between said arms, hard rubber sleeves interlocked with said tubes, and soft rubber bodies between said hard rubber sleeves.

3. An element of vehicle construction, comprising a fixed housing, a metal band mounted in said housing, a rubber body having the periphery thereof interlocked with said band and a supporting member interlocked with said body and yieldingly supported concentric of said body and capable of radial movement relatively to said housing.

In testimony whereof I affix my signature in presence of two witnesses.

SELDEN L. SIMPSON.

Witnesses:
L. E. FLANDERS,
G. E. McGRANN.